United States Patent [19]

Warszewski

[11] Patent Number: 5,772,546
[45] Date of Patent: Jun. 30, 1998

[54] CONTINUOUSLY VARIABLE AUTOMATIC DRIVE

[76] Inventor: Jaroslaw Piotr Warszewski, Skalitzer Str. 2, 10999 Berlin, Germany

[21] Appl. No.: 713,418

[22] Filed: Sep. 13, 1996

Related U.S. Application Data

[63] Continuation-in-part of Ser. No. 387,816, filed as PCT/PL94/00013, Jun. 28, 1994 published as WO95/01277, Jan. 12, 1995., abandoned.

[30] Foreign Application Priority Data

Jun. 29, 1993 [DE] Germany ........................ 43 22 382.6

[51] Int. Cl.[6] .................................................. F16H 61/00
[52] U.S. Cl. ............................................... 474/50; 474/53
[58] Field of Search ................................. 474/49, 50, 52, 474/53, 56, 57

[56] References Cited

U.S. PATENT DOCUMENTS

| 1,144,381 | 6/1915 | Reimers ................................. 474/56 |
| 3,935,751 | 2/1976 | Lee . |
| 4,373,926 | 2/1983 | Fullerton . |
| 4,642,070 | 2/1987 | Walker . |
| 5,054,801 | 10/1991 | Reimers . |

FOREIGN PATENT DOCUMENTS

| 112 112 | 6/1984 | European Pat. Off. . |
| 33 18 278 | 11/1984 | Germany . |
| 255 922 | 4/1988 | Germany . |
| 284 451 | 11/1990 | Germany . |
| 40 31 865 | 3/1992 | Germany . |
| 43 18 648 | 6/1993 | Germany . |
| WO84/02562 | 7/1984 | WIPO . |
| WO95/01277 | 1/1995 | WIPO . |

Primary Examiner—Roger J. Schoeppel
Attorney, Agent, or Firm—Foley & Lardner

[57] ABSTRACT

A continuously variable automatic drive has a front driving sprocket and a rear driven sprocket. Each of these sprockets has a housing and a plurality of involute-shaped toothed segments, each having a leading end and a trailing free end. The toothed segments are symmetrically spaced around their housings and pivotally attached to their housings about their leading ends. Each toothed segment is movable between a first position where the trailing free end is pivoted inwardly closest to the housing and the effective diameter of the sprocket is smallest and a second position where the trailing free end is pivoted outwardly farthest from the housing and the effective diameter of the sprocket is largest. The highest gear ratio is produced when the front driving sprocket is at the second position and the rear driven sprocket at the first position. The lowest gear ratio is produced when the front driving sprocket is at the first position and the rear driven sprocket is at the second position. The springs are biased so that the gearing defaults to the highest gear ratio, at the relaxed, neutral position, where no force is applied to the driving sprocket.

21 Claims, 5 Drawing Sheets

CONTINUOUSLY VARIABLE AUTOMATIC DRIVE

CROSS-REFERENCE

This is a continuation-in-part of application Ser. No. 08/387,816, filed as PCT/PL94/00013, Jun. 28, 1994, published as WO95/01277, Jan. 12, 1995, now abandoned.

BACKGROUND

The present invention relates to a continuously or infinitely variable drive, particularly adapted for bicycles, which uses an endless drive, such as a cogbelt or roller chain, to transmit power.

For durability, combined with a simple maintenance, low cost, noiseless operation, and environmentally friendly performance in bicycle drives, roller chains are increasingly abandoned in favor of toothed cogbelts. German patent publication DE 34 43 042 shows one possible embodiment of a bicycle transmission using a cogbelt.

Regardless of whether a roller chain or cogbelt is used, however, it is known to automatically continuously vary the transmission ratio. A controllable chain drive, especially for bicycles, is disclosed for example in German patent publication DE 33 18 278, where the drive sprocket includes four segments, with an opposed pair thereof equipped with teeth. All four segments are displaceable radially by a spindle drive between small and large effective diameters. A disadvantage of this type of chain drive is that an additional control chain is needed to rotate cone gears meshed with a bevel gear in displacing the chain drive sprocket segments. Rotating the bevel gear relative to the sprocket rotates the spindles and varies the sprocket diameter, which varies the transmission ratio. The requisite control chain and the associated gears, however, complicate the construction.

The relative complex construction also is not avoided in the continuous controllable bicycle drive disclosed in German patent publication DE 40 31 865. Here, the bicycle transmission operates with the push rods having slides with saw teeth, which are guided on the inside of a groove in the sprocket wheel. The slide engagement point can be continuously adjusted over a base plate mounted for rotation concentrically with the chain sprocket, so that the transmission ratio is varied upon its rotation. The adjustment of the slide engagement point across the rotatably mounted base plate, however, also complicates the construction.

Another chain drive that is variable in fine incremental steps is disclosed in German patent DDR 255 922. Here, the dead center problem is compensated for and the transmission ratio is controlled according to the force applied to the pedals. A parallel guide on which toothed segments are disposed for radial displacement is connected to a crank star or spider portion of the crank. By means of compression springs (in a form of a lock) disposed between the crank spider and the toothed segments, the toothed segments are displaced outwardly as soon as the lock is released. In this chain drive, the parallel guide has saw-tooth-shaped gaps, and pins are guided transversely to the toothed segment displacement direction. The pins are forced into the gaps against the force of the spring. To operate, a lever rotates a cam using a Bowden wire and a transmission device. This type of chain drive is also complex and requires a lever, a Bowden wire, and a transmission device.

German patent DDR 284 451 discloses a manually controlled continuously adjustable bicycle drive. This drive requires a manual shift lever to change the gear ratio. Again a Bowden wire and adjusting levers are needed to engage or disengage the transmission elements, which are forced outwardly (to a larger diameter) or brought inwardly (to a smaller diameter) by means of cylindrical rollers running in a cone pulley guide means.

SUMMARY

The present invention solves the problems associated with known continuously variable automatic transmission or drive by providing a simple sprocket construction, which eliminates the need for components such as levers operated by Bowden wires. According to the present invention, the transmission gear ratio is automatically controlled by the force applied to the driving sprocket, through an endless flexible drive, such as a toothed belt, a roller chain, etc., wrapped around the sprockets, while at the same time eliminating any dead center problems to maximize the energy input.

A continuously variable drive according to the present invention includes a driving sprocket and a driven sprocket. The endless drive is adapted to transmit power from the driving sprocket to the driven sprocket. The driven sprocket can be adapted to mount to a wheel hub, preferably a rear wheel, free-wheeling hub.

The driven sprocket comprises a driven sprocket housing that can be adapted to mount to the hub. A plurality of involute-shaped toothed segments, each having a leading end and a trailing free end, are symmetrically spaced around the housing and pivotally attached to the housing about each of their leading ends, with respect to the rotational direction of the driven sprocket. Each toothed segment is movable between a high gear ratio position and a low gear ratio position. Since the driven sprocket is driven by the driving sprocket, a smaller effective diameter produces a higher gear ratio, whereas a larger effective diameter produces a lower gear ratio. In the high gear ratio position, the trailing free end is moved inwardly closest to the housing and the effective diameter of the driven sprocket is smallest. In the low gear ratio position, the trailing free end is moved outwardly farthest from the housing and the effective diameter of the driven sprocket is largest.

A biasing means, preferably a tension spring, such as a coil or spiral spring, is provided between the housing and each of the toothed segments mounted to the housing to bias the toothed segments toward the high gear ratio position (smaller effective diameter). The effective diameter of the driven sprocket automatically varies anywhere between the low gear ratio position and the high gear ratio position based upon the force applied to the driving sprocket (and thus to the endless drive) and selected strength of the biasing means.

In one embodiment of the invention, the driven sprocket housing comprises a pair of plates, each of which can have a plurality of ears extending radially outwardly from an outer periphery thereof and equally spaced therearound. Each of the toothed segments is sandwiched and rotatably journaled about its leading end thereof between the two plates or a pair of adjacent facing ears of the two plates. Preferably, the number of the driven toothed segments and the ears is at least three.

Preferably, the biasing means is a return coil spring having a coil portion and a first arm extending from one end of the coil portion and a second arm extending from the other end of the coil portion. The coil portion is concentrically positioned about an axis of rotation of the toothed segment with the first arm engaging at least one of the two plates and the second arm engaging the toothed segment.

Specifically, each toothed segment is rotatably journaled about a pin, which passes through the plates or the ears of the plates. One end of the pin protrudes from one of the two plates where the return spring coiled portion is situated. The first arm, which extends tangentially away from the coiled portion, preferably passes through both of the plates and the second arm, which also extends tangentially away from the coiled portion, passes through the toothed segment at a distance from the coiled portion of the return spring.

Preferably, the inward movement of the toothed segments is limited by an abutment of the second arm against the outer periphery of at least one of the plates.

Similarly, the driving sprocket includes a housing, a plurality of involute-shaped toothed segments each having a leading free end and a trailing end. The driving sprocket toothed segments are also symmetrically spaced around its housing and pivotally attached thereto about their leading ends, with respect to the rotational direction of the driving sprocket. Again, each driving toothed segment is movable between a low gear ratio position and a high gear ratio position. Since the driving sprocket drives the driven sprocket, a larger effective diameter produces a higher gear ratio, whereas a smaller effective diameter produces a lower gear ratio. In the low gear ratio position, the trailing free ends of the toothed segments are moved inwardly closest to the housing and the effective diameter of the driven sprocket is smallest. In the high gear ratio position, the trailing free ends of the toothed segments are moved outwardly farthest from the housing and the effective diameter of the driven sprocket is largest.

A biasing means, preferably a compression spring such as a telescoping spring, is provided between the front driving sprocket housing and each of its toothed segments mounted to the front driving sprocket housing to bias its toothed segments toward the high gear ratio position (larger effective diameter). Preferably, one end of the compression spring is connected to the front driving sprocket housing and the other end thereof is connected to the front driving sprocket toothed segment between the leading end and the trailing end thereof.

The effective diameter of the driven sprocket automatically varies anywhere between the low gear ratio position and the high gear ratio position based upon the tension of the endless drive, which depends upon the amount of the energy input to the driving sprocket, and selected strength of the biasing means.

The driving sprocket housing can be connected to a crankarm and can have a plurality of ears extending radially outwardly from an outer periphery of the housing and equally spaced therearound. Each driving sprocket toothed segment is rotatably journaled to one of the driving sprocket housing or ears. Preferably, the number of the front driving sprocket toothed segments and the ears is at least three, four being preferred.

Preferably, each of the driving and driven toothed sprockets engages at least three teeth that engage the endless drive. To take up slack and to compensate for changing tension, a conventional slack take-up means, such as a pair of chain or belt rollers, is provided.

BRIEF DESCRIPTION OF THE DRAWINGS

These and other features, aspects, and advantages of the present invention will become more apparent from the following description, appended claims, and accompanying exemplary embodiments shown in the drawings, which are briefly described below.

DETAILED DESCRIPTION

The exemplary embodiments shown in FIGS. 1–6 serve to illustrate the present invention. Same or corresponding elements are labeled with the same reference numerals. Moreover, although references are made below to directions in describing the structure, they are made relative to the drawings for convenience. The directions, such as left, right, etc., are not intended to be taken literally or limit the present invention in any form.

Front and rear sprockets in modern day bicycles are positioned generally on the right side of the bicycle frame, from the rider's stand point, although they can be positioned on the left side. That is, the sprockets are on the side of the rider's right leg. The sprockets according to the present invention are also illustrated on the right side, but should not be limited thereto.

Figure 1:
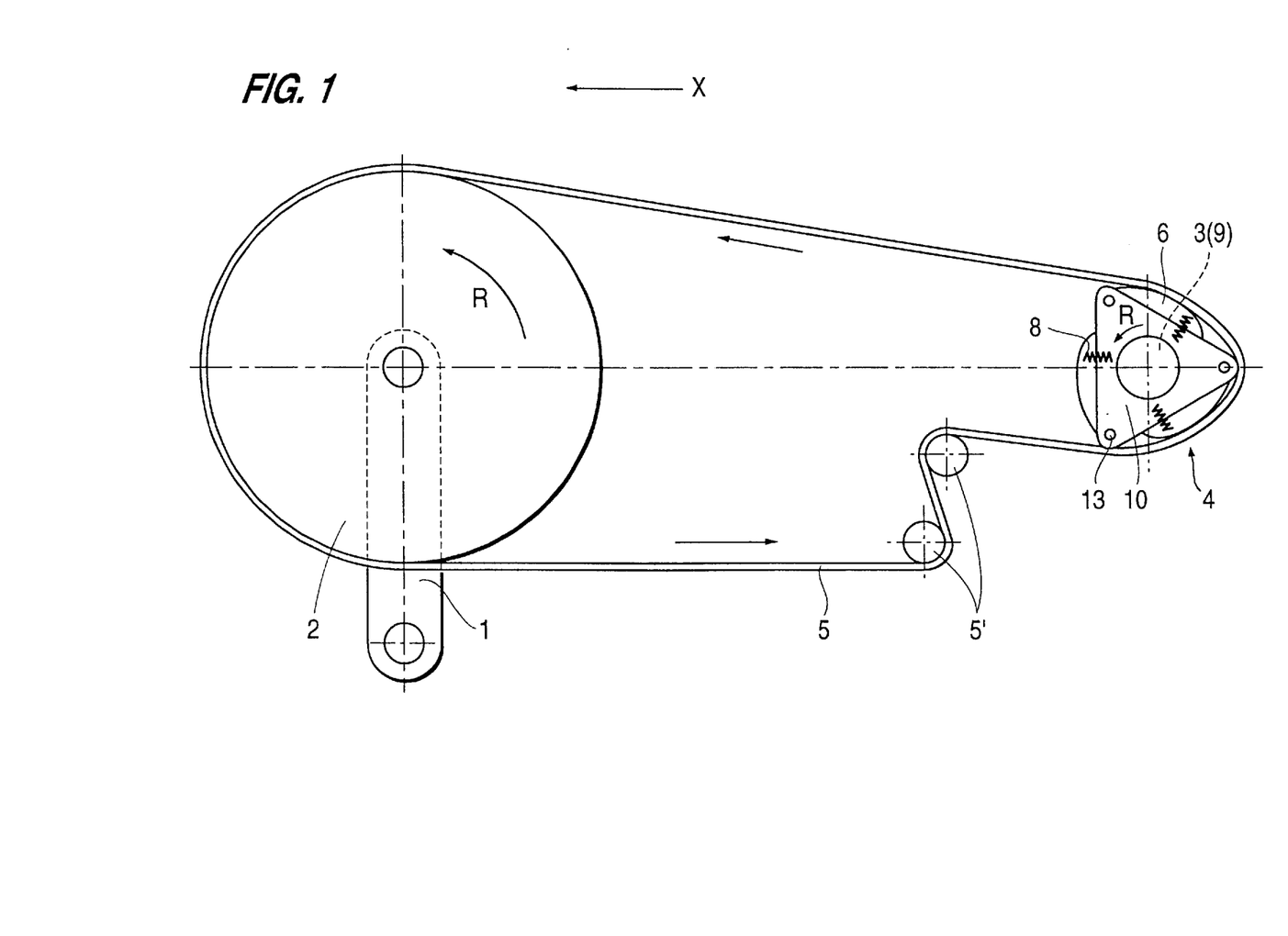
FIG. 1 is a schematic front elevational view of a continuously variable automatic bicycle drive showing a front driving sprocket and a rear driven sprocket at a neutral position according to one embodiment of the present invention.
Figure 2:
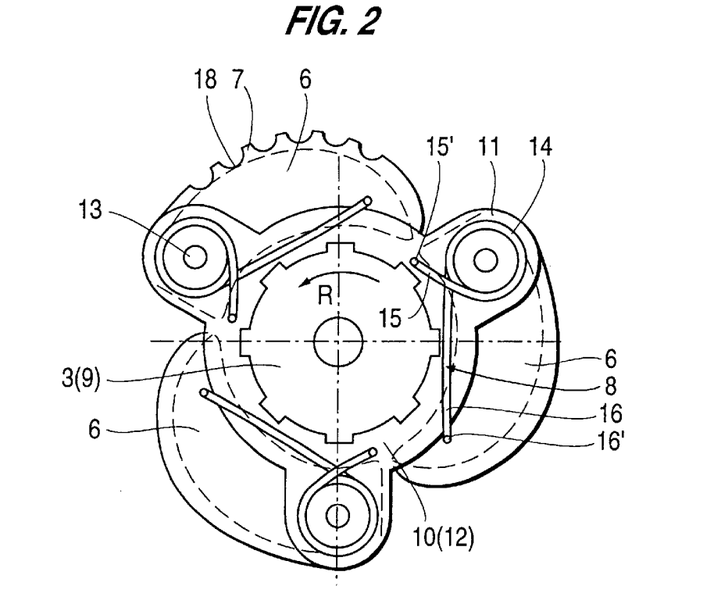
FIG. 2 is a detailed front elevational view of the rear wheel driven sprocket at a neutral position, similar to that of FIG. 1.
Figure 3:
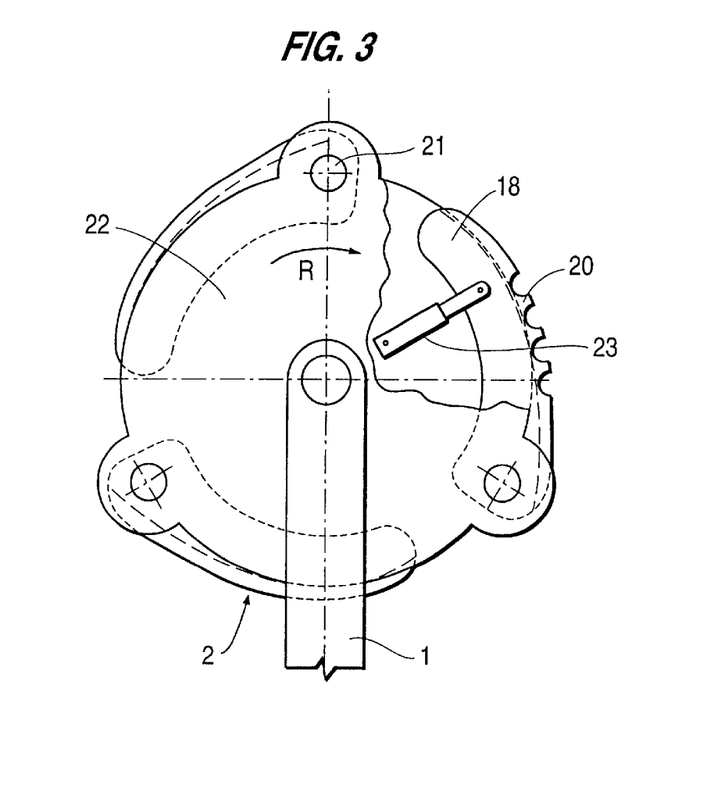
FIG. 3 is a detailed front elevational view of the front driving sprocket attached to a crank according to one embodiment of the present invention, at a fully loaded state.
Figure 4:
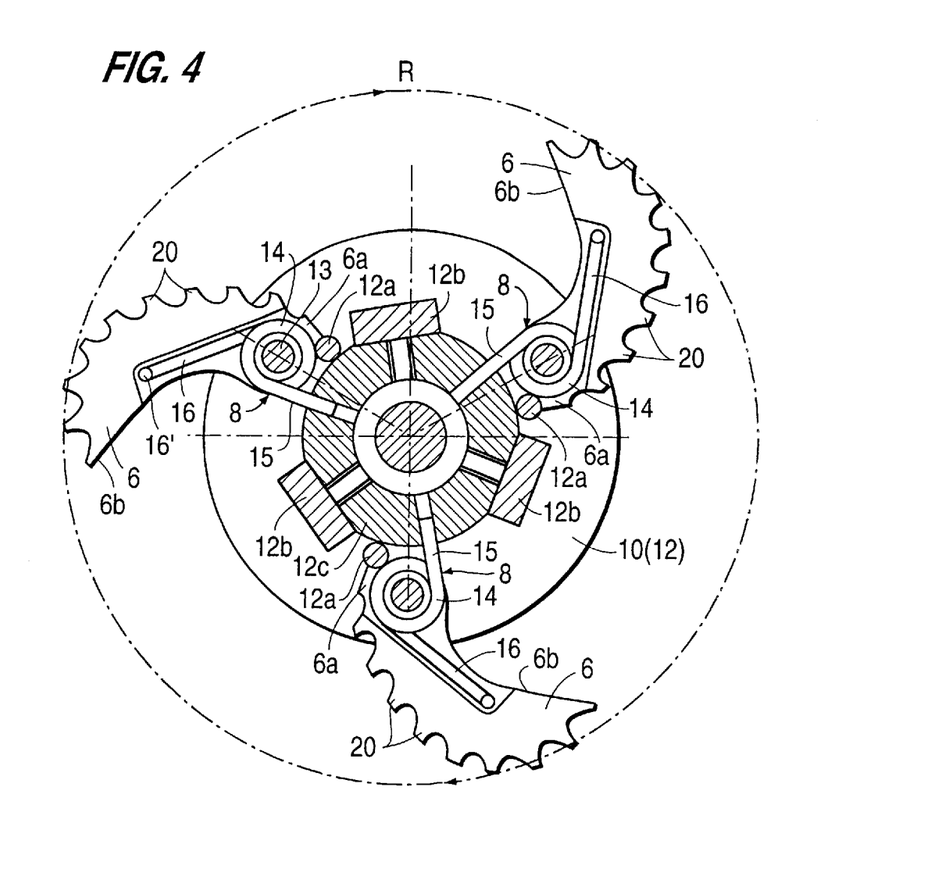
FIG. 4 is a detailed front sectional view of the driven sprocket similar to FIG. 2, but under a full load.
Figure 5:
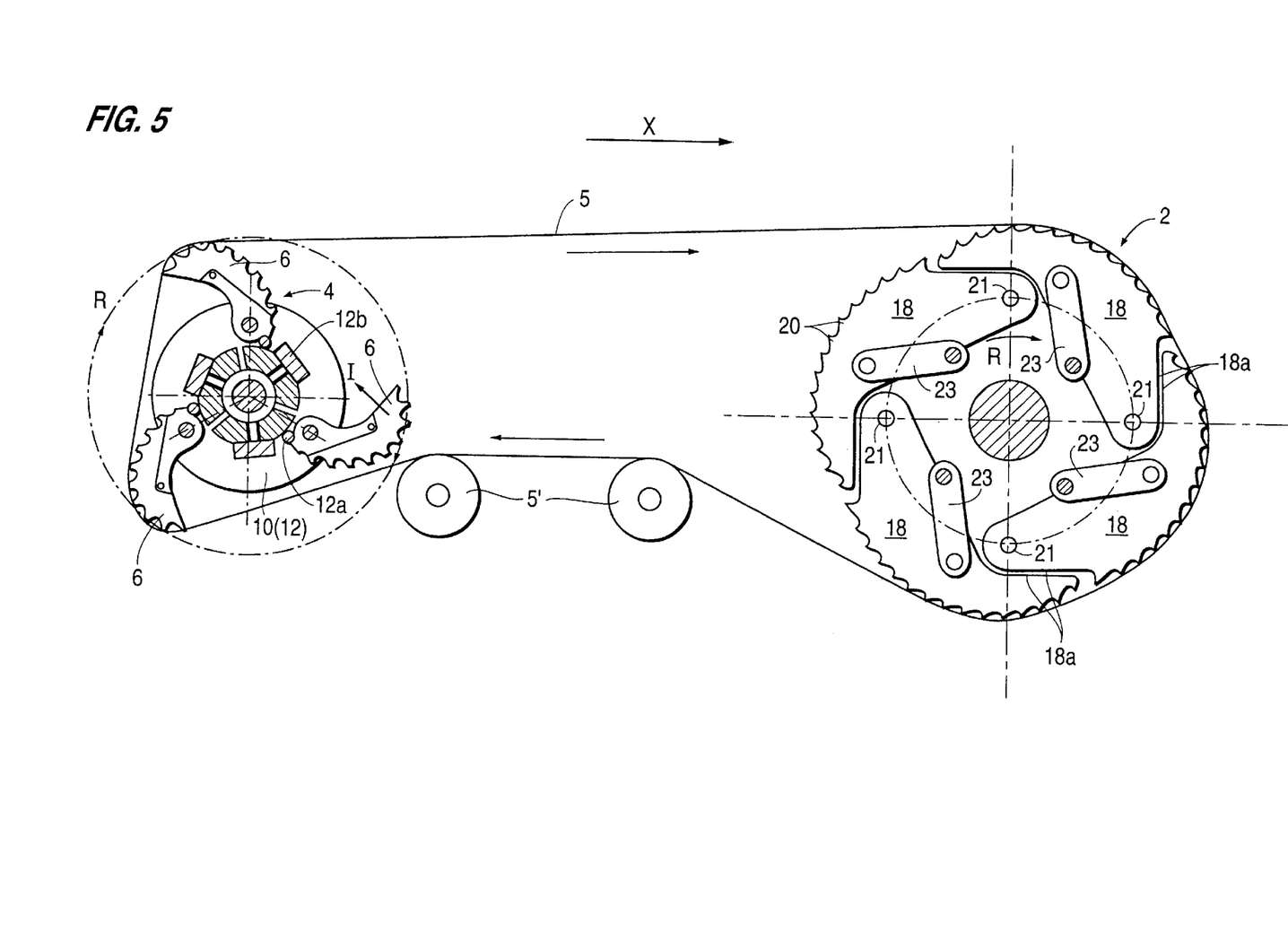
FIG. 5 is a schematic front elevational view of a continuously variable automatic bicycle drive showing another embodiment of the front driving sprocket and the driven sprocket of FIG. 4 under load.
Figure 6:
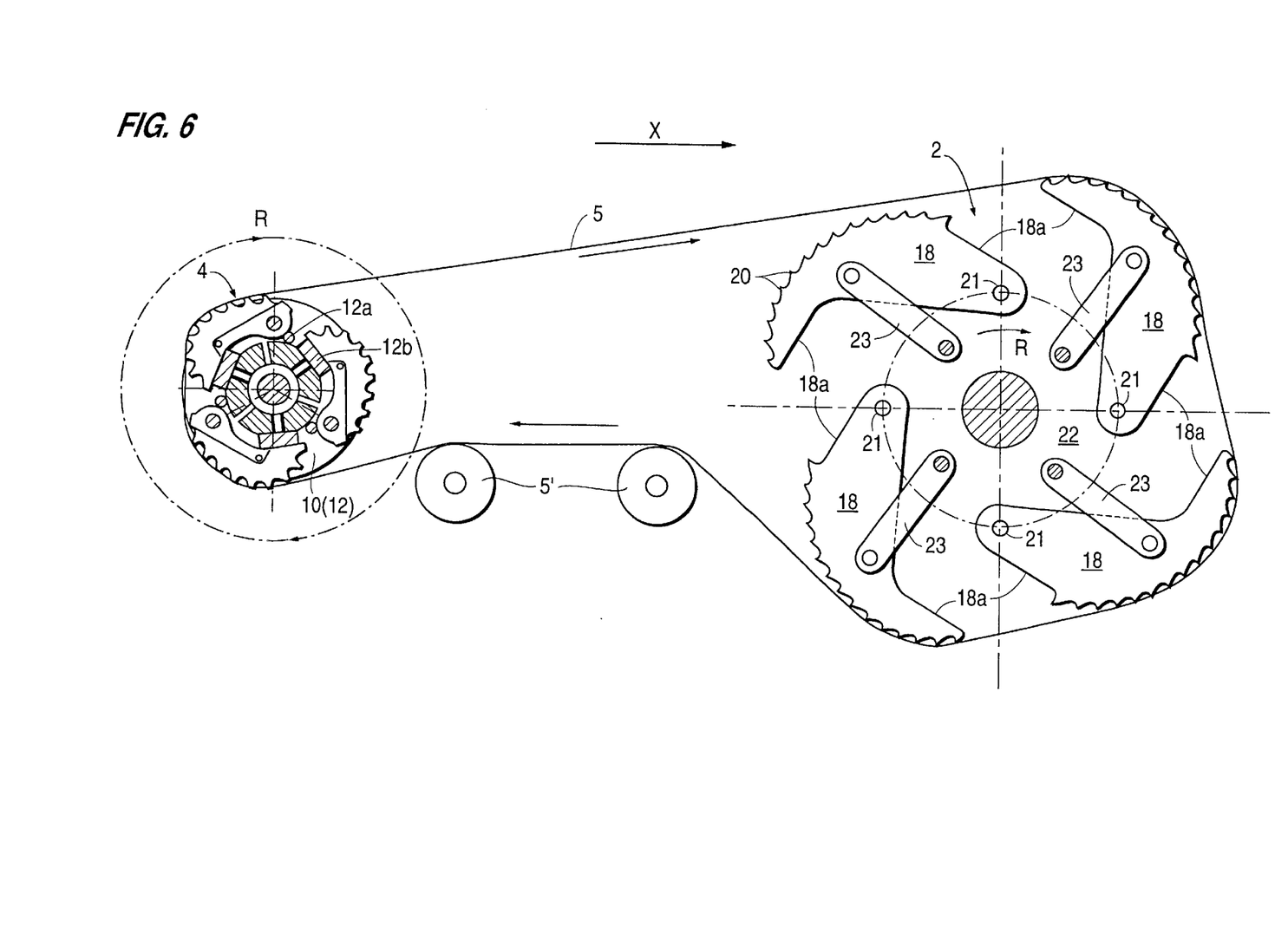
FIG. 6 is a schematic front elevational view of the continuously variable automatic bicycle drive shown in FIG. 5 under no load.

FIGS. 1–6 show various embodiments of a continuously variable automatic bicycle transmission or drive according to the present invention. FIGS. 1 and 2 shows the drive as viewed from the left side of the bicycle (not shown) in relation to its forward movement direction X. FIGS. 3–6 show the drive as viewed from the right side of the bicycle in relation to its forward movement direction X. The drive in these embodiments has a front driving sprocket 2 connected to a crankarm or crank 1 (not shown in FIGS. 5–6 for brevity), which connects to pedals (not shown), and a rear driven cog or sprocket 4 disposed on a rear wheel hub (indicated by 3(9) in FIG. 1, but not shown in detail). An endless toothed sprocket belt or chain 5 wraps around both the sprockets 2 and 4, as shown in FIGS. 1, 5, and 6. A belt tightener 5' tensions the belt to take-up slack and to provide the necessary slack. The belt tightener can comprise a pair of conventional chain or belt rollers, such as the ones equipped in conventional rear derailleurs, biased in the direction that will reduce or provide slack in the chain or belt, while the distance between the axes of rotation of the front driving sprocket and the rear driven sprocket is kept constant. The belt or chain tightener 5' can be connected to a bicycle frame or other stationary member of the bicycle.

The rear sprocket 4 has at least three toothed segments 6, as shown in FIGS. 1, 2, and 4–6, spaced equally relatively around the circumference of the rear wheel hub. Each of the toothed segments has an involute or curved configuration at the outer periphery and a generally circular configuration at the inside circumference, as shown in FIGS. 2 and 6 when the toothed segments are at a neutral (closed) position. The involuted outer periphery is formed with teeth 7, as shown in FIGS. 2 and 4–6. The belt 5 lies on these involute-shaped peripheries of the toothed segments 6. The toothed segments 6 are pivoted at their leading ends (relative to the rotation direction R) against the force of return springs 8 to a housing 10, which is preferably mounted on a free-wheel 9 (FIGS. 1–2) of the rear wheel hub.

FIGS. 1, 2, and 4 show different embodiments of the rear sprocket according to the invention, where the return springs 8 can be a coil type, as shown in FIG. 1, or spiral (torsional), as shown in FIGS. 2 and 4. FIGS. 1, 2, and 6 show rear sprockets 4 at its neutral position (under no load). In FIG. 1, the springs 8 are connected to the trailing ends of the toothed segments 6 and the springs are biased to move the toothed segments inwardly. In FIGS. 2 and 4, the springs are mounted on the leading ends of the toothed segments 6 and the springs are biased likewise to move the toothed segments inwardly.

According to FIG. 1, the housing 10 comprises a pair of symmetrical triangular plates (only one visible). Each of the three toothed segments 6 is sandwiched between the two plates, with each of the leading ends of the toothed segments sandwiched between one opposing pair of apexes of the two triangular plates and pivotally journaled thereto. A pin 13 is passed through each apex, where the toothed segments 6 are pivoted at their leading ends.

According to FIG. 2, the housing 10 for the toothed segments 6 comprises two generally circular plates 12 (only one visible), with equally spaced ears 11 extending radially outwardly from the outer periphery of the plate. Each of the toothed segments 6 is sandwiched between one facing adjacent ear pairs of the two facing plates. Each of the three toothed segments is pivotally journaled to the pin 13 in one of the ears. The pin 13, on which the toothed segments 6 are held for rotation, is passed through each ear 11. One end of the pin protrudes from one of the plates 12. On one end of the pin 13, a spiral portion 14 of the torsional spring 8 is positioned substantially coaxially therewith, as shown in FIG. 2. Two extremities or arms 15 and 16 extend tangentially from ends of the spiral portion 14. Each of the arms 15 and 16 have a bent end segment 15', 16', which is preferably bent at 90° relative to the arm. The first or shorter tangential arm 15 is connected to the housing by passing its bent end segment 15' through at least one of the two plates 12 provided with openings. The second or longer tangential arm 16 is connected to the toothed segment 6 by passing its bent end segment 16' through an opening in the toothed segment 6 at a distance from the spiral portion of the return spring 8, near the trailing end, as shown in FIG. 2.

FIG. 4 shows a sectional view an embodiment of the rear sprocket 4, which is substantially similar to FIG. 2. In FIG. 4, the housing 10 comprises a pair of circular plates (only one shown), with three equally spaced toothed segments 6. Each of the toothed segments 6 is sandwiched between two facing plates 12 and pivotally journaled to one of the three pins 13 extending perpendicularly or laterally from the plates. The spiral portion 14 of the torsional spring 8 is positioned substantially coaxially with the pin, as shown in FIG. 4. Two extremities or arms 15 and 16 extend tangentially from the ends of the spiral portion 14, substantially similarly to FIG. 2.

In FIG. 4, however, only the longer tangential arm 16 has the bent end segment 16', which also is preferably bent at 90° relative to the arm. Like the embodiment of FIG. 2, the spring 8 is connected to the toothed segment 6 by passing the end segment 16' thereof through an opening in the toothed segment 6 near the trailing end. In the embodiment of FIG. 4, the housing 10 also has a center block 12c that is concentric with the plates 12 and sandwiched therebetween. The center block 12c has three equally spaced openings for receiving the shorter tangential arms 15. Each of the shorter tangential arm 15 is thus connected to the housing by passing its end radially through the block 12c as shown in FIG. 4.

In the embodiment of FIG. 4, the housing 10 further includes three pins 12a that act as stops to limit the amount of outward rotation of the toothed segments 6. The housing 10 further includes three equally spaced stopping blocks 12b that limit the inward rotation of the toothed segments 6. Specifically, as shown in FIGS. 5 and 6 (which are shown with the springs 8 omitted for simplicity), the stops 12a allow free pivotal movement of the toothed segments between the two extreme (closed or high, as shown in FIG. 6 and open or low, as shown in FIG. 5) positions. Each stop 12a can abut an overhang 6a formed at the extremity of the leading end. When the driven toothed segments 6 are in the neutral (closed) position, their trailing end portions abut the stops 12b, as shown in FIG. 6. In this regard, the trailing end portion has a substantially flat portion 6b adapted to squarely abut against the substantially flat surfaces of the stops 12b. The stops 12b can be removably secured, such as by friction or threading, with a radially extending post inserted into the center block 12c, as shown in FIG. 4. The stops 12b with different shapes or dimensions can be interchangeably used so that the high gear ratio (at the closed, neutral position) can be changed.

The continuously variable shifting of the present bicycle drive is automatically performed based upon the amount of force transmitted through the belt 5 to the rear sprocket 4. When a greater amount of force is applied by the rider in the normal forward movement, such as when facing an uphill or incline, the toothed segments 6 are swung or pivoted outwardly about the axis of the pins 13 against the force of the return springs 8, which are biased to draw the toothed segments inwardly, and out of the housing 10, so that as the rider applies increasing force, the effective outer diameter of the toothed segments 6 increases, which in turn results in a lower transmission ratio.

The involute shape of the toothed segments 6 allows the belt 5 to cover about two-thirds of the circumference of the sprocket 4, which results in a high efficiency. To prevent the belt from applying too much force against a single tooth 7 of the toothed segment 6, it is desirable for the belt 5 to mesh with at least three teeth 7 of each toothed segment 6.

When the return springs 8 are in the tensed state, the inward turning of the toothed segments 6 is limited in the embodiment of the sprocket 4 shown in FIG. 2 by the two extremities or arms 15 and 16. That is, the second extremity or arm 16 passing through its toothed segment can abut the outer periphery of at least one of the housing plates 12. The inward turning movement of the toothed segments also can be limited by the abutment of each toothed segment against the first extremity 15, which passes through both of the plates 12. This can also be accomplished by the abutment of each toothed segment against the first extremity 15 extending tangentially out from the coiled portion 14 of the return spring associated with the following or trailing toothed segment (with respect to the direction of rotation R) and passing through both of the plates 12. In the embodiment of FIG. 4, the stops 12b limit the inward turning movement of the toothed segments 6 and the stops 12c limit the outward turning movement of the toothed segments 6, as described above.

Instead of the return springs 8 having a coiled portion and two arms tangential thereto, other spring bodies capable of drawing the driven toothed segments 6 inwardly into the housing 10 can be used, such as a spiral spring biased at the trailing end thereof, as disclosed in the embodiment of FIG. 1, or using elastic bands.

FIGS. 3 and 5–6 show various embodiments of the front sprocket 2 according the present invention. It can be seen that the sprocket 2 joined to the pedal crank (in FIG. 3) also has toothed segments 18, three of which are spaced equally therearound in FIG. 3 and four spaced equally therearound in FIGS. 5–6. These toothed segments 18 also each have an outer involute section provided with teeth 20. At their leading ends, they are rotatably journaled to a pin 21. Specifically, the front sprocket 2 has a substantially circular housing 22 connected to the crank 1. The housing can comprise a pair of substantially circular plates sandwiching the toothed segments 18 and leaving the outer periphery open, similar to the rear sprockets 4 disclosed above.

In the embodiment of FIG. 3, the housing 22 preferably has three equally-spaced ears extending radially outwardly from the outer periphery thereof, similar to the rear sprocket housing 10 of FIG. 2. It should be noted that FIG. 3 is shown under load (closed). Although the embodiment of FIGS. 5–6 does not specifically show the housing and the crank, this embodiment also has them arranged substantially similar to the embodiment of FIG. 3.

The toothed segments 18 are subjected to the force of compression springs 23. They can be in the form of coil springs or telescoping springs, which can be in the form of gas or hydraulic springs. Any spring, however, capable of forcing the driving toothed segments 18 outwardly can be used. A helical spring can also be used. The compression springs 23 are fastened at their bottom end near the axis of rotation of the sprocket 2, preferably near the bearing of the crank 1, and at the movable end of the toothed segments 18, between the leading end and the trailing end. Therefore, in the unloaded state (neutral), the trailing ends of the toothed segments 18 are moved outwardly. In the case of the telescoping spring, the outward movement is limited by the maximum length of the telescoping spring. In the embodiment of FIGS. 5–6, the spring 23 can include linkages that adds. The linkage can be telescopic or movably guided so that the it can accommodate the length change necessary to enable the toothed segment 18 to move between the two extreme positions.

In the embodiment of FIGS. 5–6, the toothed segments 18 are nestable with each other, as shown in FIG. 5, where the trailing end of the leading toothed segment 18 can nest against the leading end of the trailing toothed segment 18. In this respect, the trailing and leading ends of the toothed segments have cooperating or mating surfaces 18a that enable the toothed segments to nest and provide a substantially circular path for the belt 5 as shown in FIG. 5. This embodiment allows the toothed segment 18 that is not engaged with the belt 5 to be forced into the closed position as shown in FIG. 5; the trailing end of the leading toothed segment 18 pushes the leading end portion of the trailing toothed segment 18.

In operation, referring to FIGS. 5 and 6, the belt 5 lies on the toothed segments 18 of the front sprocket 2, engaged in its teeth. When a greater force is applied to the crank in turning the front sprocket 2, such as when facing an uphill or incline, the front toothed segments 18 are forced inwardly against the force of the springs 23, reducing the effective diameter of the sprocket 2, and reducing the transmission ratio, as shown in FIG. 5. At the same time, the rear toothed segments 6 are swung or pivoted outwardly so that the effective outer diameter of the driven toothed segments 6 increases, which in turn results in a lower transmission ratio. It should be noted that, in actual operation, the rear toothed segment 6 not engaged with the belt 5 (see FIG. 5) is inwardly drawn to its neutral position (as shown in FIG. 6), in the direction of the arrow I.

In the neutral position, under no load, the front and rear sprockets default to as shown in FIG. 6, where the front sprocket is at its largest effective diameter and the rear sprocket at its smallest effective diameter, producing a highest gear ratio.

The present invention is particularly suited for all bicycles, including sport bicycles such as mountain bicycles. By using return springs 8 and/or compression springs 23 of different spring constants, the drive characteristic can be changed.

By constructing the sprocket attached to the rear wheel hub according to the present invention, a continuous, self-adjusting bicycle drive is accomplished automatically, without additional components such as Bowden wire-controlled levers, in controlling the transmission ratio. The setting of the transmission ratio is performed by the force applied to the crank and the strength of the spring chosen.

At the same time, the stress on the tooth flanks 18 of the toothed segment changes, so that the belt does not move in a completely circular path, but on a path different therefrom. See FIG. 6 for example. This beneficially alleviates the dead center problems associated with all circularly fixed sprockets so that power is transferred uniformly to the rear sprocket. Moreover, a belt tightener, which is commercially available, should be associated with the sprockets to provide a proper slack.

The combination of the front driving sprocket and the rear driven sprocket according to the present invention satisfies all needs, including severe uphill conditions faced during mountain biking. By the present driving crank sprocket, it is possible, on a level road on which the bicycle is running, for the toothed segments to be urged out of their housing by the compression springs due to the light stress on the flanks of the teeth. At the same time, however, the return springs draw the toothed segments of the rear sprocket associated with the rear wheel hub inwardly into the housing due to the light stress on the flanks of the teeth of the toothed segments, so that a high transmission ratio automatically results, as shown in FIG. 6. If, however, the bicycle is traveling on an upgrade, the toothed segments of the crank sprocket are forced inwardly by the belt against the force of the compression springs, reducing the effective diameter thereof. At the same time, the increased force of the belt draws the rear-sprocket toothed segments out of their housing against the force of the return springs, increasing the diameter of the sprocket and reducing the transmission ratio, as shown in FIG. 5.

A simpler construction can be achieved if the housing containing the toothed segments simultaneously forms the outside wall of the free-wheel.

It is desirable to design both the compression springs and the return springs according to the weight and strength of the person using the bicycle.

Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

Priority applications, U.S. Ser. No. 08/387,816, filed Apr. 24, 1995 in U.S.; German P4322382.6, filed Jun. 29, 1993; and PCT/PL94/00013, filed Jun. 28, 1994, including their specifications, drawings, claims, and abstracts, and all amendments made in the Ser. No. 08/387,816, are hereby incorporated herein by reference.

I claim:

1. A continuously variable drive adapted for use with an endless drive, comprising:
    a driving sprocket and a driven sprocket, wherein the endless drive is adapted to connect the driving and driven sprockets to transmit rotary motion from the driving sprocket to the driven sprocket, wherein the driven sprocket comprises:
        a driving sprocket housing adapted for mounting to a rotary output;
        a plurality of involute-shaped driving toothed segments each having a leading end and a trailing free end, wherein the toothed segments are symmetrically spaced around the housing and are each pivotally attached to the housing about the leading end, each toothed segment being movable between a high gear ratio position where the trailing free end is moved inwardly closest to the housing and the effective diameter of the driven sprocket is smallest and a low gear ratio position where the trailing free end is moved outwardly farthest from the housing and the effective diameter of the driven sprocket is largest; and
        a biasing means for biasing each toothed segment mounted to the housing toward the high gear ratio position,
    wherein the effective diameter of the driven sprocket automatically varies anywhere between the low gear ratio position and the high gear ratio position based upon force applied to the driving sprocket and selected strength of the biasing means.

2. A continuously variable drive according to claim 1, wherein the housing comprises a pair of plate members, each of the toothed segments being sandwiched and rotatably journaled between the pair of plate members.

3. A continuously variable drive according to claim 2, wherein the biasing means is a return coil spring having a coil portion and a first arm extending from one end of the coil portion and a second arm extending from the other end of the coil portion, the coil portion being concentrically positioned about an axis of rotation of the toothed segment, the first arm engaging at least one of the two plate members and the second arm engaging the toothed segment and being movable therewith.

4. A continuously variable drive according to claim 3, further comprising means for limiting the inward movement of the toothed segments.

5. A continuously variable drive according to claim 1, further comprising a tightener adapted for taking up slack of the endless drive belt.

6. A continuously variable drive according to claim 2, wherein the number of the toothed segments is at least three.

7. A continuously variable drive according to claim 1, wherein the driving sprocket comprises:
    a driving sprocket housing;
    a plurality of involute-shaped driving sprocket toothed segments each having a trailing free end and a leading end, wherein the driving sprocket toothed segments are symmetrically spaced around the driving sprocket housing and are each pivotally attached to the driving sprocket housing about the leading end, each driving sprocket toothed segment being movable between a front low gear ratio position where the trailing free end thereof is moved inwardly closest to the driving sprocket housing and the effective diameter of the driving sprocket is smallest and a front high gear ratio position where the trailing free end thereof is moved outwardly farthest from the driving sprocket housing and the effective diameter of the driving sprocket is largest; and
    a driving sprocket biasing means for biasing each of the driving sprocket toothed segments mounted to the driving sprocket housing toward the front high gear ratio position,
    wherein the effective diameter of the driving sprocket automatically varies anywhere between the front low gear ratio position and the front high gear ratio position based upon force applied to the crank and selected strength of the driving sprocket biasing means.

8. A continuously variable drive according to claim 7, wherein the driving sprocket biasing means is a compression spring.

9. A continuously variable drive according to claim 8, wherein one end of the compression spring is connected to the driving sprocket housing and the other end thereof is connected to the driving sprocket toothed segment between the leading end and the trailing free end thereof.

10. A continuously variable drive according to claim 7, wherein the driving sprocket housing is connected to a crank and comprises at least one plate member, each of the driving toothed segments being rotatably journaled to plate member.

11. A continuously variable drive according to claim 10, wherein the number of the driving sprocket toothed segments is at least three.

12. A continuously variable bicycle gear adapted for use with an endless drive to transmit power, comprising:
    a housing;
    a plurality of involute-shaped toothed segments each having a leading end and a trailing free end, wherein the toothed segments are symmetrically spaced around the housing and are each pivotally attached to the housing about the leading end, each toothed segment being movable between a first gear ratio position where the trailing free end is inwardly moved closest to the housing and the effective diameter of the gear is smallest and a second gear ratio position where the trailing free end is moved outwardly farthest from the housing and the effective diameter of the gear is largest, wherein one of the first and second gear ratio positions being a high gear ratio position and the other a low gear ratio position; and
    a biasing means for biasing each of the toothed segments mounted to the housing toward the high gear ratio position,
    wherein the effective diameter of the gear automatically varies anywhere between the first gear ratio position and the second gear ratio position based upon pulling force applied to the endless drive and selected strength of the biasing means.

13. A continuously variable bicycle drive according to claim 12, wherein the housing comprises a pair of plates each having a plurality of mounting supports equally spaced around an outer periphery thereof, each of the toothed segments being sandwiched and rotatably journaled about the leading end between one facing pair of the mounting supports of the two plates.

14. A continuously variable bicycle drive according to claim 12, wherein the housing is connected to a crank and comprises at least one plate member, each of the toothed segments being rotatably journaled about the leading end to the plate member.

15. A continuously variable bicycle drive according to claim 13, wherein the number of the toothed segments and the mounting supports is at least three.

16. A continuously variable bicycle drive according to claim 14, wherein the number of the toothed segments is at least three.

17. An automatic bicycle drive according to claim 13, wherein the first gear ratio is high and the second gear ratio is low, wherein each toothed segment is movable between the high gear ratio position where the trailing free end is moved inwardly closest to the housing and the effective diameter of the gear is smallest and the low gear ratio position where the trailing free end is moved outwardly farthest from the housing and the effective diameter of the gear is largest.

18. A continuously variable bicycle drive according to claim 14, wherein the first gear ratio is low and the second gear ratio is high, wherein each toothed segment is movable between the low gear ratio position where the trailing free end is moved inwardly closest to the housing and the effective diameter of the gear is smallest and the high gear ratio position where the trailing free end is moved outwardly farthest from the housing and the effective diameter of the gear is largest.

19. A continuously variable bicycle drive according to claim 17, wherein the biasing means is a coil spring having a coil portion and a first arm extending from one end of the coil portion and a second arm extending from the other end of the coil portion, the coil portion being concentrically positioned about an axis of rotation of the toothed segment, the first arm being fixedly positioned about at least one of the two plates and the second arm engaging the toothed segment and movable therewith.

20. A continuously variable bicycle drive according to claim 18, wherein the biasing means is a compression spring with one end thereof connected to the housing and the other end thereof connected to the toothed segment between the leading end and the trailing free end.

21. A continuously variable drive comprising:
a driving sprocket adapted to be rotatably mounted to a frame and rotated;
a driven sprocket adapted to be rotatably mounted to the frame at a fixed distance from the driving sprocket at least while the driving sprocket is rotated;
an endless drive wrapped around the driving and driven sprockets to transmit rotary motion from the driving sprocket to the driven sprocket, wherein the driving sprocket comprises:
a driving sprocket housing;
a plurality of involute-shaped driving sprocket toothed segments each having a trailing free end and a leading end, wherein the driving sprocket toothed segments are symmetrically spaced around the driving sprocket housing and are each pivotally attached to the driving sprocket housing about the leading end, each of the driving sprocket toothed segments being movable between a first low gear ratio position where the trailing free end thereof is moved inwardly closest to the driving sprocket housing and the effective diameter of the driving sprocket is smallest and a first high gear ratio position where the trailing free end thereof is moved outwardly farthest from the driving sprocket housing and the effective diameter of the driving sprocket is largest; and
a driving sprocket biasing means for biasing each of the driving sprocket toothed segments mounted to the driving sprocket housing toward the first high gear ratio position, and
wherein the driven sprocket comprises:
a driven sprocket housing;
a plurality of involute-shaped driven toothed segments each having a leading end and a trailing free end, wherein the driven toothed segments are symmetrically spaced around the housing and are each pivotally attached to the driven sprocket housing about the leading end, each of the driven toothed segments being movable between a second high gear ratio position where the trailing free end of the driven toothed segment is moved inwardly closest to the driven sprocket housing and the effective diameter of the driven sprocket is smallest and a second low gear ratio position where the trailing free end of the driven toothed segment is moved outwardly farthest from the driven sprocket housing and the effective diameter of the driven sprocket is largest; and
a biasing means for biasing each of the driven toothed segments mounted to the driven sprocket housing toward the second high gear ratio position,
wherein the effective diameter of the driving and driven sprockets automatically vary anywhere between a combination of the first low to high gear ratio positions and the second low to high gear ratio positions based upon rotary force applied to the driving sprocket and selected strength of the driving and driven sprocket biasing means.

* * * * *